United States Patent [19]

Doery et al.

[11] 4,436,301
[45] Mar. 13, 1984

[54] DOCUMENT RESTACK TRANSPORT

[75] Inventors: Michael S. Doery, Rochester; Edward W. C. Hanzlik, Webster; John A. Adamek, Rochester; William J. McLaughlin, Fairport, all of N.Y.

[73] Assignee: Xerox Corporation, Stamford, Conn.

[21] Appl. No.: 317,630

[22] Filed: Nov. 2, 1981

[51] Int. Cl.³ .................. B65H 29/32; B65H 29/54
[52] U.S. Cl. .................. 271/177; 271/3.1; 271/176; 271/197
[58] Field of Search ............... 271/180, 181, 3.1, 176, 271/177, 197, 70, 72, 66, 83, 276; 414/73; 355/3 SH, 14 SH

[56] References Cited

U.S. PATENT DOCUMENTS

| | | | |
|---|---|---|---|
| Re. 29,124 | 1/1977 | Hudson | 355/3 R |
| 965,375 | 7/1910 | Dean | 271/180 |
| 2,995,366 | 8/1961 | Moedmeut . | |
| 3,022,999 | 2/1962 | Mead . | |
| 3,305,233 | 2/1967 | Cody | 271/180 |
| 3,367,651 | 2/1968 | Eller et al. | 271/70 |
| 3,517,926 | 6/1970 | Oram et al. . | |
| 3,557,948 | 1/1971 | Girlack et al. | 209/80.5 |
| 3,608,895 | 9/1971 | Kalven . | |
| 3,698,708 | 10/1972 | Brawn | 271/180 |
| 3,708,058 | 1/1973 | Kalven . | |
| 3,820,779 | 6/1974 | Bishop | 271/197 X |
| 3,907,128 | 9/1975 | Cathus . | |
| 3,918,701 | 11/1975 | Lee | 271/224 X |
| 3,970,554 | 7/1976 | Stange | 271/195 |
| 4,062,536 | 12/1977 | Michelson | 271/177 |
| 4,129,295 | 12/1978 | Hori et al. | 271/209 X |
| 4,162,067 | 7/1979 | Horak et al. | 271/177 |

OTHER PUBLICATIONS

Sevak, N. M., "Store and Refeed Concept for an Inverter", *Xerox Disclosure Journal*, vol. 6, No. 4, Jul.-/Aug. 1981, p. 173.
Boase, E. et al., "Recirculating Document Feeder", *Research Disclosure*, item 16,659, Feb. 1978, pp. 38–39.

*Primary Examiner*—Bruce H. Stoner, Jr.
*Assistant Examiner*—James E. Barlow

[57] ABSTRACT

A recirculating document handler having a document restack transport. The transport includes a series of spaced vacuum assisted drive belts for transporting successive documents to a position above a document stacking tray. A sensor is used to note the passage of a document lead edge past an input to the restack transport. After a delay which allows the document to be driven to the position above the stacking tray the document is separated from the drive belts by a knockdown bail and a reduction in the vacuum attraction between the document and the drive belts. The bail comprises a series of rods supported in locations between the drive belts which pivot into contact with the document and drive it into the stacking tray. The rods contact the document near its trailing edge to force the trail edge to the stacking tray.

1 Claim, 3 Drawing Figures

DOCUMENT RESTACK TRANSPORT

BACKGROUND OF THE INVENTION

1. Field of the Invention

The present invention relates to method and apparatus for stacking documents and more particularly relates to a restacking system in a copier having a recirculating document handler.

2. Background

As xerographic and other copiers have become more automated, the need for high speed yet reliable methods for handling both copy sheets and original documents to be copied has increased. The capability to copy both sides of an original complicates and increases the document and copy sheet handling requirements of the copier. In automatic duplex copying the document originals must be transmitted to a copier platen and then restacked so the opposite document side may be copied.

So called recirculating document handlers (RDHs) perform the complex function of manipulating the document original in a controlled manner past the platen for copying. In a typical recirculating document handler, documents are placed by the copier user in normal collated order in a copier stacking tray and then sequentially fed from the bottom of that tray to a conventional platen where they are imaged onto a photoreceptor. After one side of the original has been copied, the document is returned to the top of the stacking tray via a return feed path.

Moving the document around this feed path at high speeds becomes difficult if the copier is to handle a variety of sizes and weights of papers. As copier flexibility is increased the complexity of the recirculating document handler is also increased and in particular the restacking of documents in the paper tray becomes difficult.

The problem of landing a series of documents in a copier stacking tray is more than a problem in free fall dynamics. The trajectory of the document must be controlled so that the document is not damaged and so that the document hits a landing area and stops in approximate position registration so that it can be recirculated past the platen for duplex copying.

3. Prior Art

A February 1978 research disclosure article No. 16,659 by Boase, E., et al., entitled "Recirculating Document Feeder" addresses the problem of landing the document in the restack tray. The apparatus disclosed in that article includes a vacuum belt traveling beneath both a vacuum chamber and a pressure chamber which are connected by a narrow passage. Both chambers have ports facing the belt. As a document is delivered to the belt, the document seals the ports and is held to the belt by a vacuum. The document is held against the belt until its trailing edge uncovers the vacuum port. When this occurs, the vacuum chamber communicates with the atmosphere so the amount of air delivered from the pressure chamber to the vacuum chamber through the passageway is diminished. The pressure at the port still in contact with the document is accordingly increased, "gently" separating the document from the belt and blowing the document downward into a hopper or restack tray.

A different kind of paper stacking technique is disclosed in U.S. Pat. No. 3,918,701 to Lee entitled "Sheet Fed Paper Tray Paper Retaining Assembly". That patent shows the use of an assembly which includes a deflector which contacts a sheet fed into the paper tray and deflects it towards the bed of the paper tray. After the paper is deflected it is stopped by a second member and stacked in the tray by the force of gravity.

U.S. Pat. No. 3,820,779 to Bishop entitled "Sheet Delivery Apparatus" discloses apparatus for feeding cards or the like to a stack. Apparatus constructed in accordance with this patent includes so called "ejector strips" which move into frictional engagement with the card and physically separate it from a system conveyor belt. Once the separation occurs gravity attracts the card to a stack position beneath the conveyor.

The apparatus disclosed in U.S. Pat. No. 4,129,295 to Hori et al also deflects moving documents in their path to a paper restack tray. A guide element positioned above the tray intercepts documents discharged along an upward path and guides the documents down into the stacking tray.

Both the forced air and the deflector techniques for sheet restacking have deficiences. While the forced air technique "gently" blows the document to the restack tray, that document is experiencing a variety of forces which can be described as unpredictable at best. If the document is to be recirculated in a reliable manner the sheets must be restacked and not merely piled one on another in a haphazard manner. The research disclosure stacking technique suffers from a second deficiency perhaps more serious than the first. In high speed recirculating documents it is simply not feasible to wait for the document to be blown "gently" onto the restack tray in an uncontrolled manner.

Those systems with deflectors will restack at high speeds but at the expense of damage to the document. The deflector contacts every document's leading edge as the document enters the restack tray. As the document speed is increased to improve copier speed the impact between deflector and leading edge tends to dent the leading edge, especially for light weight documents. Modifying the '701 deflector by using a lightweight flexible material has been tried with only slight improvement in maintaining document integrity.

SUMMARY OF THE INVENTION

The present invention overcomes inadequacies in prior art document restacking mechanisms by controlled routing of successive documents to the restack tray under conditions which do not damage the document. According to the invention, the document is knocked down into the document tray by a knock down device so that the document does not flutter to the tray in an uncontrolled manner. The knock down device contacts the document's surface rather than its edge so that the leading edge is not dented.

The disclosed sheet stacking apparatus includes means for receiving a document such as a restack tray and means for moving successive sheets along an input path to a position above the tray. The means for moving preferably includes a vacuum assisted belt drive mounted above the input path which supports the documents in their travel to the tray.

Unlike prior art document restack mechanisms, the apparatus also includes drive means for driving successive sheets from the belt drive. The drive means is mounted for movement between a first position removed from the input path and a second position where the drive means intercepts the path to contact successive sheets and drive them into the restack tray. Finally, the apparatus includes a mechanism for moving the drive means between the first and second positions in synchronism with movement of the sheets so the drive means contacts the surface rather than the edge of the sheets.

According to the preferred embodiment of the invention, the means for moving include a series of spaced apart vacuum assisted drive belts driven by a common drive roller. The belts form a series of endless loops which surround a vacuum source for those belts. Both the vacuum source and the belts include a series of apertures extending along the direction of document travel. As the belts are powered in their endless loop movement, successive ones of the apertures in the belt align with the apertures in the vacuum source. The documents are attracted to the belts and driven along the endless loop path until they reach a position over the document tray.

The drive means for knocking documents away from the belts into the restack tray comprises a series of knockdown rods having one end connected to a drive shaft rotatably mounted above the document path. Activation of the drive shaft causes the rods to pivot between the first and second positions and drive the documents into the restack tray. In the preferred embodiment of the invention the vacuum source defines a series of grooves between the drive belts into which the rods pivot in their first position. Timing of the document feeding and actuation of the knockdown rods are coordinated to insure the documents are properly stacked in the restack tray.

So long as the document knockdown bars are actuated when the document is positioned over the restack tray the document will be contacted along its surface rather than at its leading edge. Attraction between the vacuum assisted belts and the paper may be periodically disrupted in coordination with document movement to insure the knockdown bars separate the document from the drive belts.

From the above it should be appreciated that one object of the invention is to provide a rapid yet reliable document restack technique which does not damage the documents. Other objects and features of the invention will be better understood by reference to the following detailed description of a preferred embodiment of the invention when considered in conjunction with the accompanying drawings.

DETAILED DESCRIPTION OF A PREFERRED EMBODIMENT

Figure 1:
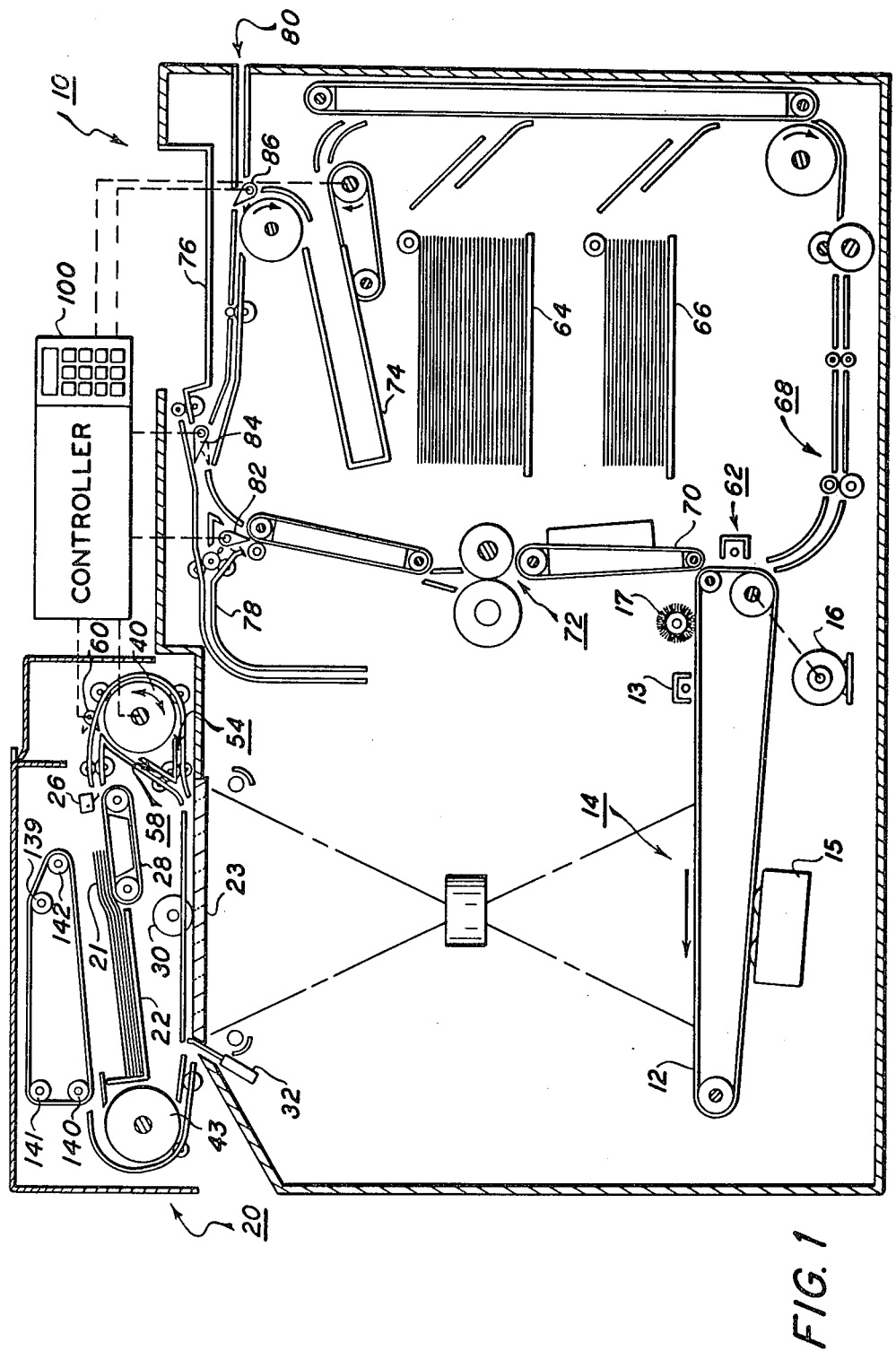
FIG. 1 is a schematic elevational view of examplary copier and an exemplary recirculating document handler which includes a document restack transport constructed in accordance with the present invention.

Turning now to the drawings, FIG. 1 schematically shows an exemplary copier 10 including a conventional xerographic photoreceptor belt 12 and a series of conventional xerographic processing stations acting on the belt for respectively charging 13, exposing 14, developing 15, driving 16 and cleaning 17. The copier 10 is adapted to provide duplex or simplex copy sets from either duplex or simplex original documents stacked in a recirculating document handler 20. Various steps of the xerographic process are coordinated and monitored under the control of a controller 100.

In the exemplary recirculating document handler (RDH) 20, individual original document sheets are sequentially fed from a stack of document sheets 21 placed by the operator facedown in normal forward collated order in a document stacking and holding tray 22, i.e. with page 1 on the top of the stack, face up. The document sheets are fed from the bottom of the stack seriatim to an imaging station 23, which is the conventional copying platen of the copier 10, to be conventionally imaged onto a photoreceptor 12 for the production of copies in a conventional xerographic manner. The documents are stacked initially, and as will be described in detail also restacked automatically during each circulation, in the tray 22 over the platen 23. The document handler 20 has conventional switches or other sensors for sensing and counting the individual documents fed from the tray 22, i.e. counting the number of document sheets circulated. A conventional resettable bail or finder drops to indicate through its associated switch or sensor 26 the completion of each circulation of the complete document set, by sensing that all the documents have been fed out from under it, and then is automatically reset on the top of the stack before the next circulation. The document feeder 20 is adapted to serially sequentially feed the documents, which may be various conventional sizes and weights of sheets of paper or plastic containing letters, drawings, prints, photographs, etc. A bottom feeder 28 feeds the bottommost document sheet, on demand by the controller, from the stack through one of two selected feed paths described below to a platen drive 30 which moves the document into a registration position, against a registration gate 32, over the copier platen 23, where the side of the document facing the platen 23 is copied.

A light image of an original document positioned on the platen 23 is recorded on the photoreceptor 12 and a latent image. The latent image is developed and subsequently transferred at a transfer station 62. Copy sheets fed from a selected one of a main 64 and auxiliary 66 paper trays and moved along a copy sheet feed path 68 to the transfer station 62. The developed toner powder image is transferred to the copy sheets which are then carried by a vacuum transport 70 to a conventional roll fuser station 72 for the fusing of the developed toner powder image. From the fuser 72 the copy sheets are delivered to either a duplex tray 74, an output tray 76, an inverter 78, or an output path 80.

The copy sheet path chosen after the fuser 72 depends on the mode of copier operation as selected by the operator. Subsequent to this selection the controller 100 dictates the operation of a number of gates or fingers 82, 84, 86 which direct the copy sheets to an appropriate destination. Further details regarding the paper paths chosen subsequent to fusing may be found in U.S. Pat. Ser. No. 71,613 to Sahay entitled "Recirculating Duplex Documents Copier", now U.S. Pat. No. 4,278,344 which has been assigned to assignee of the present invention. That application is incoporated herein by reference.

In this document feeder 20 each document is selectably inverted or not inverted as it is fed from the tray 22 to the imaging station 23 through one of two paths selectable by the controller. This is accomplished before the document is copied. The two paths here are provided by a selectably reversable sheet drive roller (inverting roller) 40 and a selectable position gate or deflector 60 in the document path. Each document sheet is fed initially from tray 22 around the outside of the roller 40. If the document path is continued around roller 40, it is fed invertedly through a first path 54 onto the platen 23, conventionally. However, the decision gate 60 in the document path here is adjacent the entrance to roller 40 and comprises pivotable, normally raised, deflector fingers which may be lowered after the trail edge of the document has passed this gate. (Switch 26 or another switch can sense the trail edge and start a count of sufficient time for it to pass.) Subsequent actuation of the gate 60, together with coordinated reversal of the roller 40, causes the further recirculatory movement of the document to reverse and pass through a second and different transport path 58 to the platen for copying. The second transport path 58 provides no sheet inversion between the stack and the platen, whereas the first transport path 54 inverts the document sheet (once) between the stack and the platen.

When moving along the path 58, the reversal of the roller 40 causes the documents to only go partially around the roller 40 and then be reversed in direction and fed directly back through the gate 60. The now deflecting down gate 60 deflects the document into the path 58 which feeds directly onto the platen 23. Thus, in this path 58, the documents arrive at the platen with the same orientation as their original orientation in tray 22. Simplex documents stacked facedown in the tray 22 will thereby still be facedown when they reach the platen 23 for copying, providing the path 58 is utilized.

In contrast, the first inverting transport path 54 transports the documents unidirectionally and without reversal fully around the roller 40 onto the platen 26. Thus, the orientation or facing on the copy platen 23 of documents fed through the simplex path 54 is inverted from the previous orientation of those documents in the tray 22.

It may be seen that the return path of the documents to the tray 22 from the platen after they are copied is always the same here, regardless of which of the two initial paths 54 or 58 is used. This document return path has one sheet inversion, provided by feeding the documents around a second, but non-reversing, inverting roller 43, which returns the documents to a position above the top of the stack in tray 22.

Figure 3:
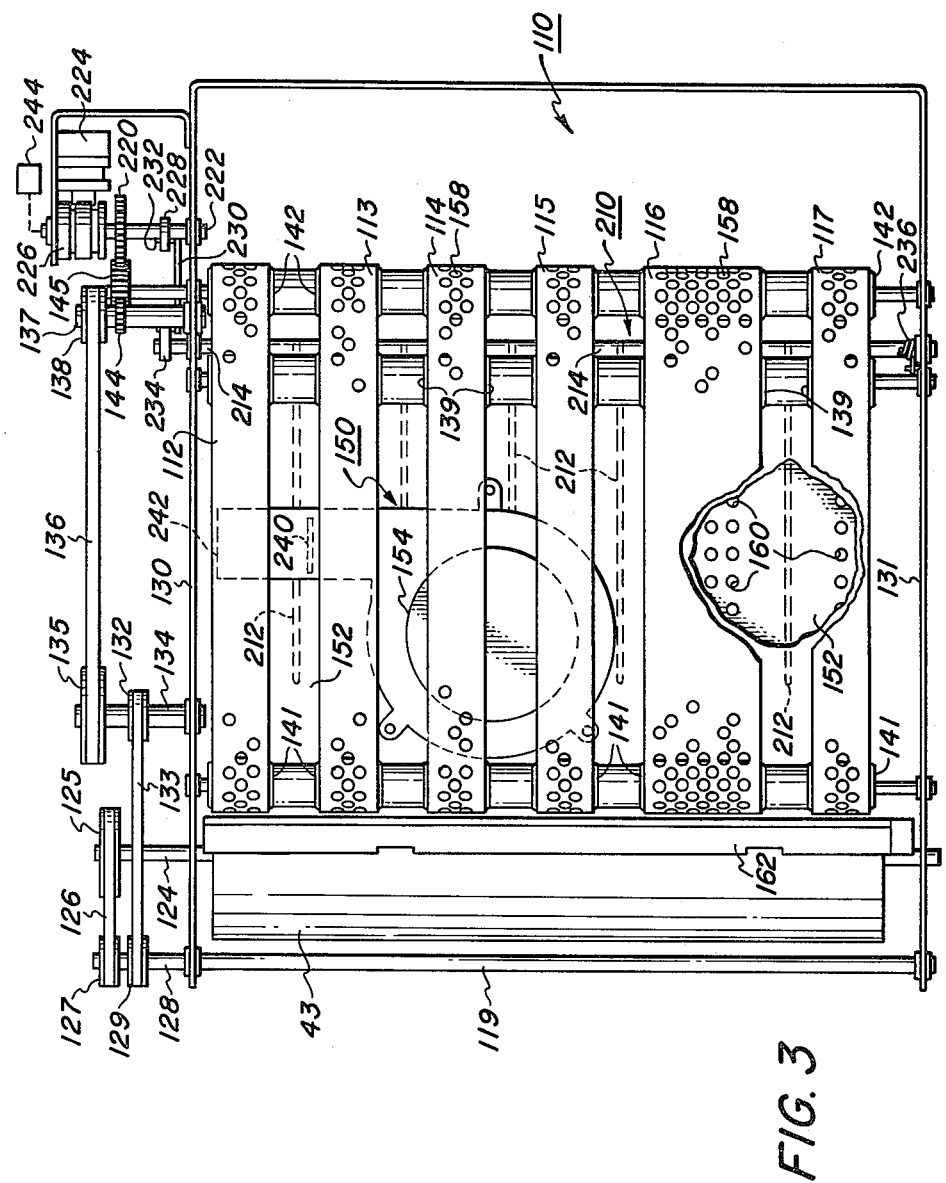
FIG. 3 is a plan view of the document restack transport.

After passing the inverting roller 43, the documents 111 are assisted to the position above the tray 22 by a vacuum assisted document restack transport 110 comprising a series of six drive belts 112-117 (FIG. 3). To enable the user to place a stack of documents into the tray 22 the transport 110 pivots away from the tray about an axis 119. The transport 110 may be held in this upright position by a counterbalance 120. Once the documents to be copied are inserted into the tray 22 the transport 110 is manually pivoted down against the copier until an interlock switch 122 senses a pressure from a contact 123 mounted to the pivoting transport 110. Closure of the switch 122 enables the user to initiate copying by activating a start print button on the copier.

The entire RDH mechanism 20 including the document restack transport 110 is driven by a common drive motor (not shown). The drive motor transmits power to a turn around roll drive shaft 124 by a belt drive or the like. Mounted to the shaft 124 is a pulley 125 which drives a first belt 126 which in turn rotates a pulley 127 whose axis of rotation coincides with the pivoting axis 119 of the transport 110. This pulley 127 in turn drives a shaft 128 which supports a second pulley 129. These aforementioned pulleys 125, 128, 129 and shafts 124, 128 do not translate as the transport 110 is pivoted with respect to the document stacking tray 22.

The transport 110 power train further includes a series of drive elements which are mounted for rotation to two transport side members 130, 131 at points removed from the axis 119 and therefore do experience linear motion as the transport 110 is pivoted about its axis 119. The pulley 129 is connected to an intermediate drive pulley 132 through a belt 133 for driving an intermediate shaft 134 and a second intermediate pulley 135. The pulley 135 drives a belt 136 which rotates a restack transport drive shaft 137 through a pulley 138.

Each of the six drive belts 112-117 forms an endless loop about three idle rollers 139, 140, 141 and one drive 142 roller mounted for rotation to the transport side members 130, 131. The drive roller 142 is coupled to the drive shaft 137 through two gears 144, 145 mounted to the drive shaft 137 and drive roller 142 respectively. Accordingly, rotation of the drive shaft 137 drives the belts 112-117 about an endless loop bounded by the rollers 138, 139, 140, 142.

As seen most clearly in FIG. 3 the three idle rollers 139-141 and the drive roller 142 support the belts 112-117 so they encompass a volume containing a vacuum source 150. Mounted to a top surface 152 of the source 150 is a blower 154 for creating a reduction in pressure inside the source 150. The source 150 also defines a bottom surface which faces the stacking tray 22 and is contacted by each of the belts 112-117. Each of the belts 112-117 defines a pattern of apertures 158 which move past a series of apertures 160 in the vacuum source 150. As documents pass from the inverting roller 43 the reduced pressure inside the source 150 attracts the documents to the belts 112-117 allowing them to be driven to a position above the document stacking tray 22.

One belt 116 is substantially wider than the others. The positioning of this belt with respect to the restack tray 22 allows documents having lengths less than the tray width to be transported with both bottom and top edges in contact with the belts 112,116. The position and width of the belt 116 is chosen to accommodate certain popular paper lengths.

A static eliminating member 162 mounted to the document transport side members 130, 131 tends to eliminate static electricity build up on the documents as they travel along the paper path. This static eliminator insures the reduction of electrostatic forces which might otherwise adversely effect the document restack function. To insure that the documents contact the drive belts 112-117 as they are driven from the reversing roller 43, the restack transport 110 includes a series of handoff-supports 164 spaced across the width dimension of the transport 110. These supports 164 are mounted directly beneath the static eliminator 162. Also mounted to the document transport 110 is a sensor 166 which monitors the passage of documents toward the document stacking tray 22. A suitable sensor comprises a light source and photodetector which senses the reflection of light from the paper. When the sensor 166 senses the passage of a leading edge of a particular document, that document has been transferred to the drive belts 112-117. After a time period which depends on the speed with which the belts 112-117 move the document, that document is positioned above the restack tray 22. Accordingly, the sensor 166 is used to generate control signals for initiating the separation of the document from the drive belts 112-117.

Once the documents are positioned above the restack tray 22, they are decoupled from the drive belts by a knockdown bail comprising a series of knockdown rods 212 attached to a rotatably supported drive rod 214. As the document is initially driven to its position above the restack tray 22, the knockdown rods 212 are stationary at a first position between the series of spaced drive belts 112-117. In this first position the rods 212 fit within a series of grooves defined by the vacuum source 150. When so positioned, the rods 212 are removed from the document feed path and do not disrupt document travel toward the restacking tray 22. Under control of the sensor 166, the rods 212 are pivoted through a second position by rotation of the drive rod 214. The rods 212 engage the document causing it to separate from the drive belts 212-217 and continued rotation of the rods 212 about the pivot axis of the drive rod 214 affirmatively forces the document into the restack tray.

Figure 2:
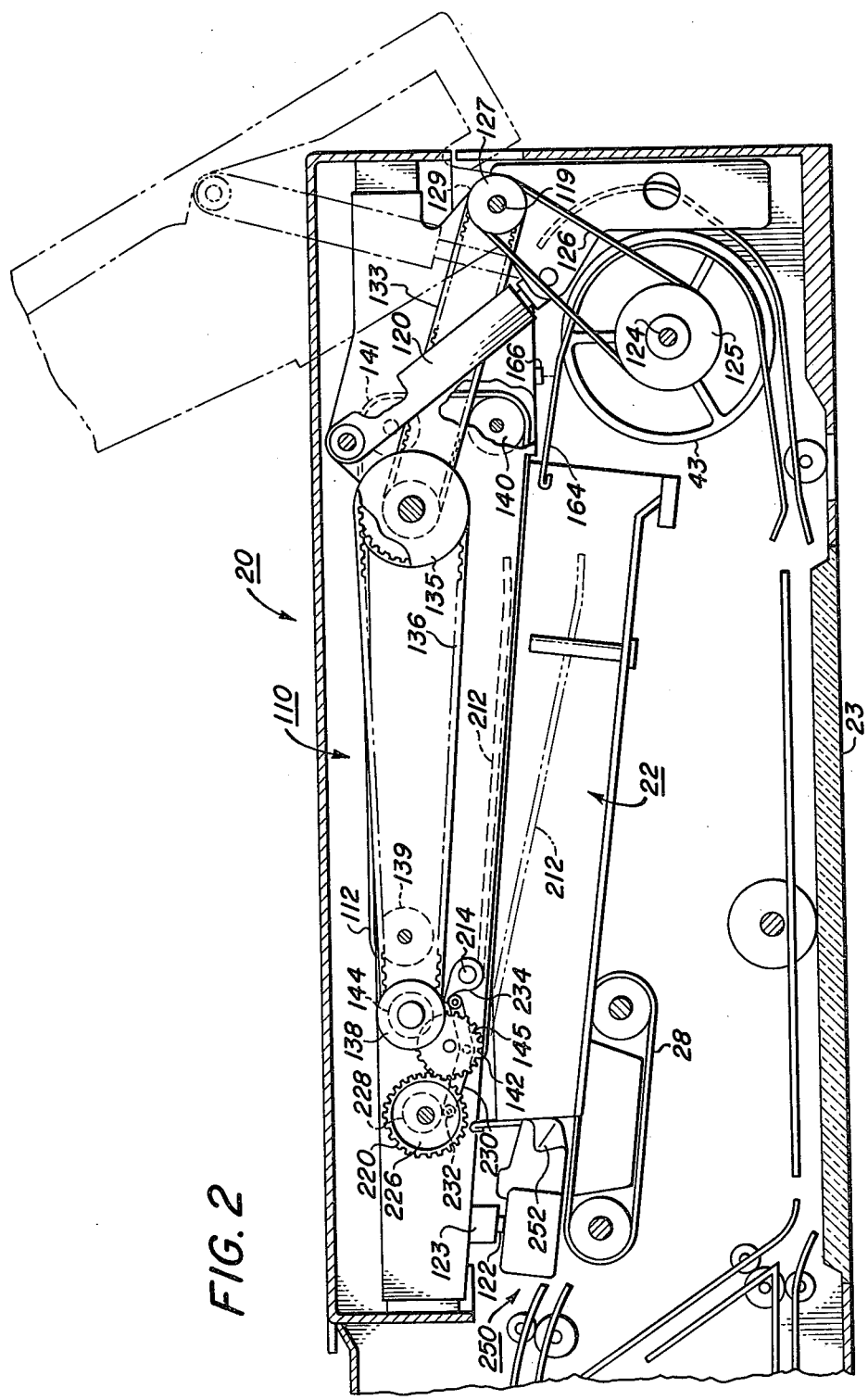
FIG. 2 is an elevational view of the document restack transport illustrated schematically in FIG. 1.

The same gear 145 which drives the belt drive roller 142 transmits power to the drive rod 214 for pivoting the knockdown rods 212 into contact with the document. As seen most clearly in FIG. 3, the gear 145 which drives the belts 112-117 is also coupled to a gear 220 mounted to a rotatably supported shaft 222. A solenoid 224 responsive to control signals coordinated with the sensor 166 is actuated to engage a bail clutch 226. Since the sensor 166 only senses passage of the document to the belts 112-117 a suitable delay period is introduced before the clutch 226 is engaged. When so engaged, the clutch 226 causes the gear 220 to rotate the shaft 222 which rotates a cam surface 228 (FIG. 2). It is rotation of this cam surface 228 which introduces the pivoting action to the knockdown rods 212. As seen in FIG. 2, a cam following arm 230 pivots with respect to the document transport 110 about a point intermediate the cam surface 228 and the knockdown bar drive rod 214. As the cam surface 228 rotates with respect to the transport 110, a cam follower 232 pivots the arm 230 (clockwise) causing the arm 230 to contact an extension 234 connected to the drive rod 214. Continued rotation of the cam surface 228 causes the drive rod 214 to pivot which in turn moves the knockdown rods 212 away from the vacuum source into engagement with the document. The knockdown drive rod 214 is tensioned by a spring 236 which raises the knockdown rods 212 away from the document path of travel when the cam surface 228 pivots the arm 230 in a counterclockwise direction.

The clutch 226 is a half revolution clutch which rotates the shaft 222 and cam surface 228 one half revolution each time it is engaged. The shape of the cam surface 228 is such that the arm 230 pivots the rods 212 toward the tray 22 on alternate cycles and allows the spring 236 to re-rotate the rods 212 away from the tray 22 on alternate cycles. The timing of the clutch actuations accordingly can be adjusted to insure the documents are properly stacked in the tray 22.

When the knockdown bars 212 engage the document, the vacuum assist supplied by the vacuum source 150 is reduced thereby diminishing the attraction exerted on the document. To reduce the vacuum assist, a flapper valve 240 chokes off an exit port 242 to the blower 154 thereby reducing the vacuum inside the source 150. The flapper valve 240 is responsive to an optical encoder sensor 244 which senses the rotational orientation of the shaft 222 to which the cam surface 228 is coupled.

When the cam surface is rotated to impart a pivoting action to the rods 212, the sensor 244 generates control signals for choking off the exit port 242 and remove the vacuum assist from the drive belts 112-117. When the cam surface is rotated to a position where the torsion spring raises the rods 214 away from the stacking tray 22, the valve 242 is again opened allowing the blower to again generate a vacuum inside the source 150.

When the documents are separated from the drive belts 112-117, they are stacked in a controlled manner in the restack tray 22. When the document originals are initially placed in the stacking tray 22, a guide member (not shown) is positioned along the width of the paper stacking tray 22 to position the stack with respect to the tray 22. As seen in FIGS. 1 and 2, the restack tray 22 is angled with respect to the horizontal to allow gravity to aid in restacking the documents at the rear of the tray 22. An air assist manifold 250 directs an air flow at the front of the restack tray 22. The air assist manifold 250 exerts a force against a bottom surface of the tray 22 which assists the transport 28 in moving the bottom sheets from the tray. The air assist 250 includes a number of nozzles 252 shown schematically in FIG. 2 which directs an air flow along the width of the document restack transport.

Once a complete set of documents have been recirculated past the platen and stacked, subsequent copier operation may dictate they be again transported past the platen for duplex copying. When a desired copying sequence has been completed, the system operator pivots the document restack transport 110 away from the document tray 22 and removes the documents therefrom.

It should be appreciated that certain design modifications might be made to the present invention. In particular, for transport of heavier weight documents, it is not necessary that the vacuum assist be periodically reduced since those heavier weight documents are separated from the drive belts with the vacuum assist in effect. It should also be appreciated that other mechanisms for pivoting the knockdown drives into engagement with the traveling document could be employed. It is therefore the intent that all modifications or alternations falling within the spirit or scope of the appended claims be covered by the present invention.

We claim:

1. In a recirculating document handler for sequentially feeding document sheets at a high rate of speed from the bottom of a document restacking tray to an imaging station of a copier and for sequentially returning the document sheets to said document restacking tray, the improvement in controlled high speed restacking of flimsy document sheets in said document tray comprising:
   a plurality of vacuum sheet transport belts extending over said document restacking tray for retaining thereagainst and transporting flimsy document sheets out over said document restacking tray from adjacent an upstream (entrance) end thereof toward a downstream end thereof,
   wherein one said vacuum belt is adapted to vacuum-retain one edge of each said flimsy document sheet,
   and wherein a second said vacuum belt is spaced from said one belt by plural intervening said belts, and has a width greater than said intervening belts, so as to vacuum-retain the opposite edge of various popular lengths of said sheets, sheet sensing means for sensing the transporting of a document sheet over said document tray by said transport belts.

document sheet knockdown means actuated by said sheet sensing means for rapidly separating a transported document sheet from said transport belts and mechanically pushing that document sheet down into said document restacking tray when the document sheet is in a restacking position, said document sheet knockdown means comprising a plurality of elongated bars interdigitated with said plurality of vacuum transport belts and recessed out of the document sheet path of said vacuum transport belts when not so actuating, said elongated bars being pivotally mounted, relative to the sheet transport path of said vacuum sheet transport belts, to have a maximum knockdown effect on the trailing portion of a document sheet adjacent said upstream (entrance) end of said document restacking tray when so actuated, and means actuated in coordination with said document sheet knockdown means to remove vacuum from said vacuum sheet transport belts during said actuation of said knockdown means.

* * * * *